US008896586B2

(12) United States Patent
Wu et al.

(10) Patent No.: US 8,896,586 B2
(45) Date of Patent: Nov. 25, 2014

(54) GATE DRIVING METHOD FOR CONTROLLING DISPLAY APPARATUS AND GATE DRIVER USING THE SAME

(75) Inventors: Tse-Hung Wu, New Taipei (TW); Li-Tang Lin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 715 days.

(21) Appl. No.: 13/182,457

(22) Filed: Jul. 14, 2011

(65) Prior Publication Data

US 2012/0154361 A1 Jun. 21, 2012

Related U.S. Application Data

(63) Continuation-in-part of application No. 13/099,368, filed on May 3, 2011.

(30) Foreign Application Priority Data

Dec. 15, 2010 (TW) ............................... 99143907 A
May 20, 2011 (TW) ............................... 100117782 A

(51) Int. Cl.
*G06F 3/038* (2013.01)
*G09G 3/36* (2006.01)

(52) U.S. Cl.
CPC ...... *G09G 3/3677* (2013.01); *G09G 2310/0291* (2013.01)
USPC .......................................... 345/211; 345/694

(58) Field of Classification Search
CPC ..... G09G 3/3677; G09G 3/3688; G11C 14/00
USPC .......... 345/211, 90, 96, 694, 100; 365/185.08
See application file for complete search history.

(56) References Cited

U.S. PATENT DOCUMENTS 7,649,519 B2 1/2010 Seo et al.
8,154,500 B2 * 4/2012 Kim ............................. 345/100

(Continued)

FOREIGN PATENT DOCUMENTS

CN 101156195 4/2008
CN 101162335 4/2008

(Continued)

OTHER PUBLICATIONS

"Office Action of Taiwan Counterpart Application" , issued on Oct. 29, 2013, p. 1-p. 8.

(Continued)

*Primary Examiner* — Quan-Zhen Wang
*Assistant Examiner* — Yuk Chow
(74) *Attorney, Agent, or Firm* — Jianq Chyun IP Office

(57) ABSTRACT

A gate driver for controlling a display apparatus is provided. The gate driver includes a logic circuit, a plurality of buffers, and a charge sharing module. The logic circuit generates a plurality of switch signals. The buffers are coupled to the logic circuit. Each of the buffers determines to provide a first voltage or a second voltage according to one of the switch signals to generate a gate driving signal. The charge sharing module is coupled to the output ends of the buffers and allows the output ends of the buffers to share charges according to a plurality of sharing signals during a forward edge and a backward edge of a square wave of each of the gate driving signals. Furthermore, a gate driving method for controlling a display apparatus is also provided.

14 Claims, 12 Drawing Sheets

(56) References Cited

U.S. PATENT DOCUMENTS

| | | | | |
|---|---|---|---|---|
| 2002/0036609 | A1 | 3/2002 | Kajihara et al. | |
| 2004/0041763 | A1 | 3/2004 | Kodama et al. | |
| 2006/0103618 | A1* | 5/2006 | Miura | 345/96 |
| 2010/0109995 | A1 | 5/2010 | Fang | |
| 2011/0050759 | A1* | 3/2011 | Katsutani et al. | 345/694 |

FOREIGN PATENT DOCUMENTS

| | | |
|---|---|---|
| CN | 101176140 | 5/2008 |
| CN | 101561601 | 10/2009 |
| TW | 200709143 | 3/2007 |
| TW | 200811788 | 3/2008 |
| TW | 201042602 | 12/2010 |

OTHER PUBLICATIONS

"First Office Action of China Counterpart Application" , issued on Dec. 2, 2013, p. 1-p. 7.

"Office Action of China Counterpart Application" , issued on May 19, 2014, p. 1-p. 6.

* cited by examiner

GATE DRIVING METHOD FOR CONTROLLING DISPLAY APPARATUS AND GATE DRIVER USING THE SAME

CROSS-REFERENCE TO RELATED APPLICATION

This application is a continuation-in-part application of and claims the priority benefit of a prior application Ser. No. 13/099,368, filed on May 3, 2011, now pending. The prior application Ser. No. 13/099,368, claims the priority benefit of Taiwan application serial no. 099143907, filed on Dec. 15, 2010. This application also claims the priority benefit of Taiwan application serial no. 100117782, filed on May 20, 2011. The entirety of each of the above-mentioned patent applications is hereby incorporated by reference herein and made a part of this specification.

BACKGROUND OF THE INVENTION

1. Field of the Invention

The invention relates to a driving method and an apparatus using the same, and more particularly to a gate driving method and an apparatus using the same.

2. Description of Related Art

A liquid crystal display (LCD) monitor has characteristics of light weight, low power consumption, zero radiation, etc. and is widely used in many information technology (IT) products, such as computer systems, mobile phones, and personal digital assistants (PDAs). The operating principle of the LCD monitor is based on the fact that different twist states of liquid crystals result in different polarization and refraction effects on light passing through the liquid crystals. Thus, the liquid crystals can be used to control amount of light emitted from the LCD monitor by arranging the liquid crystals in different twist states, so as to produce light outputs at various brightness, and diverse gray levels of red, green and blue light.

Please refer to FIG. 1, which is a schematic diagram of a thin film transistor (TFT) LCD monitor 10 of the prior art. The LCD monitor 10 includes an LCD panel 100, a source driver 102, a gate driver 104 and a voltage generator 106. The LCD panel 100 is composed of two substrates, and space between the substrates is filled with liquid crystal materials. One of the substrates is installed with a plurality of data lines 108, a plurality of scan lines (or gate lines) 110 and a plurality of TFTs 112, and another substrate is installed with a common electrode for providing a common signal Vcom outputted by the voltage generator 106. The TFTs 112 are arranged as a matrix on the LCD panel 100. Accordingly, each data line 108 corresponds to a column of the LCD panel 100, each scan line 100 corresponds to a row of the LCD panel 100, and each TFT 112 corresponds to a pixel. Note that the LCD panel 100 composed of the two substrates can be regarded as an equivalent capacitor 114.

In FIG. 1, the gate driver 104 sequentially generate the gate driving signals VG_1-VG_M to row by row activate the TFTs 112 and update pixel data stored in the equivalent capacitors 114. In detail, please refer to FIG. 2, which is a schematic diagram of the gate driver 104. The gate driver 104 includes a logic circuit 105 and buffers 107_1-107_M. Load modules 109_1-109_M are equivalent circuits of loads. The logic circuit 105 controls transistor switches of the buffers 107_1-107_M to alternatively provide a high voltage VGG or a low voltage VEE to the load modules 109_1-109_M, so as to create square waves of the gate driving signals VG_1-VG_M.

However, since parasitical capacitors exist between the equivalent capacitors 114 and gates of the TFTs 112, variations of the gate driving signals VG_1-VG_M couple into the equivalent capacitors 114 via the parasitical capacitors during backward edges of the square waves of the gate driving signals VG_1-VG_M, such that the equivalent capacitors 114 store image contents with biases. In order to the coupling effect, the gate driver 104 adjusts waveforms of the square waves of the gate driving signals VG_1-VG_M, as illustrated in FIG. 3. As a result, instant variations of the gate driving signals VG_1-VG_M no longer affect the image contents stored in the equivalent capacitors 114. Certainly, to generate the waveform shown in FIG. 3, the gate driver 104 has to include additional control circuits.

On the other hand, the main function of the gate driver 104 shown in FIG. 1 is to switch the charging path of pixels of the LCD monitor 10. However, in order to meet the requirement of fast speed, the gate driver 104 may cause the LCD monitor 10 to generate abnormal image contents. Accordingly, in order to avoid this issue, various designs have been developed. The most commonly-used method is the usage of dynamically controlling and adjusting the outputs of the gate driver 104 by the system circuit. However, this method would cause more power consumption in the system, and further, spending extra cost of the system circuit to achieve this goal can not be avoided.

Therefore, adjusting the waveforms of the gate driving signals more economically has been a major focus of the industry.

SUMMARY OF THE INVENTION

The invention is directed to a gate driver and a driving method capable of economically adjusting the waveforms of the gate driving signals.

The invention provides a gate driver for controlling a display apparatus. The gate driver includes a logic circuit, a plurality of buffers, and a charge sharing module. The logic circuit generates a plurality of switch signals. The buffers are coupled to the logic circuit. Each of the buffers includes a first end coupled to the logic circuit, a second end coupled to a first voltage source, a third end coupled to a second voltage source, and an output end coupled to a load module. Each of the buffers determines to provide a first voltage or a second voltage according to one of the switch signals to generate a gate driving signal. The charge sharing module is coupled to the output ends of the buffers and allows the output ends of the buffers to share charges according to a plurality of sharing signals during a forward edge and a backward edge of a square wave of each of the gate driving signals.

In an embodiment of the invention, the gate driver further includes a switch module. The switch module is coupled between the buffers, the first voltage source, and the second voltage source. The switch module electrically isolates the first voltage source and the second voltage source from the buffers according to at least one breaking signal during the forward edge and the backward edge of the square wave of each of the gate driving signals.

In an embodiment of the invention, the switch module is open according to the at least one breaking signal during the forward edge and the backward edge of the square wave of each of the gate driving signals. The sharing signal corresponding to the gate driving signal indicates the charge sharing module to connect to the loads corresponding to the buffers, so as to allow the output ends of the buffers to share charges.

In an embodiment of the invention, the switch module includes a first switch. The first switch is coupled between the buffers and the first voltage source. The first switch electrically isolates the first voltage source from the buffers according to a first breaking signal during the forward edge and the backward edge of the square wave of each of the gate driving signals.

In an embodiment of the invention, the switch module includes a second switch. The second switch is coupled between the buffers and the second voltage source. The second switch electrically isolates the second voltage source from the buffers according to a second breaking signal during the forward edge and the backward edge of the square wave of each of the gate driving signals.

In an embodiment of the invention, each of the buffers includes a P-type field-effect transistor (FET) and an N-type field-effect transistor (FET). The P-type FET includes a gate end coupled to the first end, a source end coupled to the second end, and a drain end coupled to the output end. The P-type FET determines electrical connection between the output end and the first voltage source according to the switch signal. The N-type FET includes a gate end coupled to the first end, a source end coupled to the third end, and a drain end coupled to the output end. The N-type FET determines electrical connection between the output end and the second voltage source according to the switch signal.

In an embodiment of the invention, the charge sharing module includes a plurality of third switches and a plurality of fourth switches. The third switches are coupled between the output ends of the corresponding buffers. The third switches sequentially electrically connects corresponding buffers of the buffers according to a first sharing signal during the forward edges and the backward edges of the square waves of the gate driving signals. The fourth switches are coupled between the output ends of the corresponding buffers. The fourth switches sequentially electrically connects corresponding buffers of the buffers according to a second sharing signal during the forward edges and the backward edges of the square waves of the gate driving signals.

In an embodiment of the invention, when the third switches electrically connect the buffers corresponding to the third switches according to the first sharing signal, the fourth switches electrically isolate the buffers corresponding to the fourth switches from one another according to the second sharing signal. When the fourth switches electrically connect the buffers corresponding to the fourth switches according to the second sharing signal, the third switches electrically isolate the buffers corresponding to the third switches from one another according to the first sharing signal.

In an embodiment of the invention, the third switches and the fourth switches alternately electrically connect the buffers corresponding to the third switches and the buffers corresponding to the fourth switches according to the first sharing signal and the second sharing signal, respectively.

In an embodiment of the invention, the gate driver further generates at least one breaking signal and the sharing signals.

The invention provides a gate driving method for controlling a display apparatus. The gate driving method includes following steps. A first voltage and a second voltage are provided to a plurality of buffers. The buffers are determined to output the first voltage or the second voltage to generate a plurality of gate driving signals according to a plurality of switch signals. Output ends of the buffers are allowed to share charges according to a plurality of sharing signals during a forward edge and a backward edge of a square wave of each of the gate driving signals.

In an embodiment of the invention, the gate driving method further includes following steps. The first voltage and the second voltage are electrically isolated from the buffers according to at least one breaking signal during the forward edge and the backward edge of the square wave of each of the gate driving signals.

In an embodiment of the invention, the step of electrically isolating the first voltage and the second voltage from the buffers includes following steps. The first voltage is electrically isolated from the buffers according to a first breaking signal during the forward edge and the backward edge of the square wave of each of the gate driving signals.

In an embodiment of the invention, the step of electrically isolating the first voltage and the second voltage from the buffers includes following steps. The second voltage is electrically isolated from the buffers according to a second breaking signal during the forward edge and the backward edge of the square wave of each of the gate driving signals.

In an embodiment of the invention, the step of allowing the output ends of the buffers to share charges includes following steps. A plurality of corresponding buffers of the buffers are sequentially electrically connected according to a first sharing signal during the forward edges and the backward edges of the square waves of the gate driving signals. A plurality of corresponding buffers of the buffers are sequentially electrically connected according to a second sharing signal during the forward edges and the backward edges of the square waves of the gate driving signals.

In an embodiment of the invention, when the buffers corresponding to the first sharing signal are electrically connected according to the first sharing signal, the buffers corresponding to the second sharing signal are electrically isolated from one another according to the second sharing signal. When the buffers corresponding to the second sharing signal are electrically connected according to the second sharing signal, the buffers corresponding to the first sharing signal are electrically isolated from one another according to the first sharing signal.

In an embodiment of the invention, the step of allowing the output ends of the buffers to share charges further includes following steps. The buffers corresponding to the first sharing signal and the buffers corresponding to the second sharing signal are alternately electrically connected according to the first sharing signal and the second sharing signal, respectively.

In an embodiment of the invention, the gate driving method further includes following steps. At least one breaking signal and the sharing signals are generated.

Based on the above, in the exemplary embodiments of the invention, the display controls and adjusts the outputs of the gate driver by the foregoing gate driving method, so as to reduce the extra cost of the system circuit. Furthermore, the display also sequentially controls the outputs of each gate driver to highly reduce the power consumption of the system.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
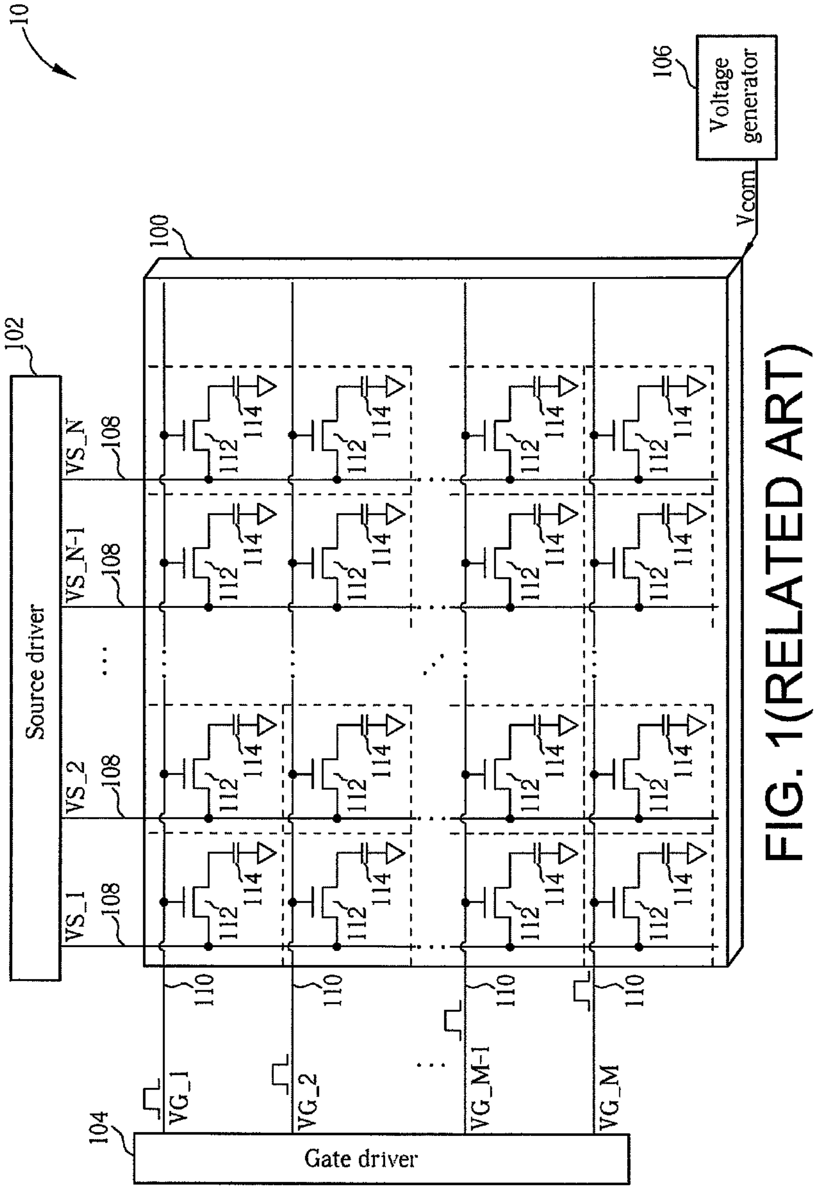
FIG. 1(RELATED ART)
FIG. 1 is a schematic diagram of a TFT LCD monitor of the prior art.
Figure 2:
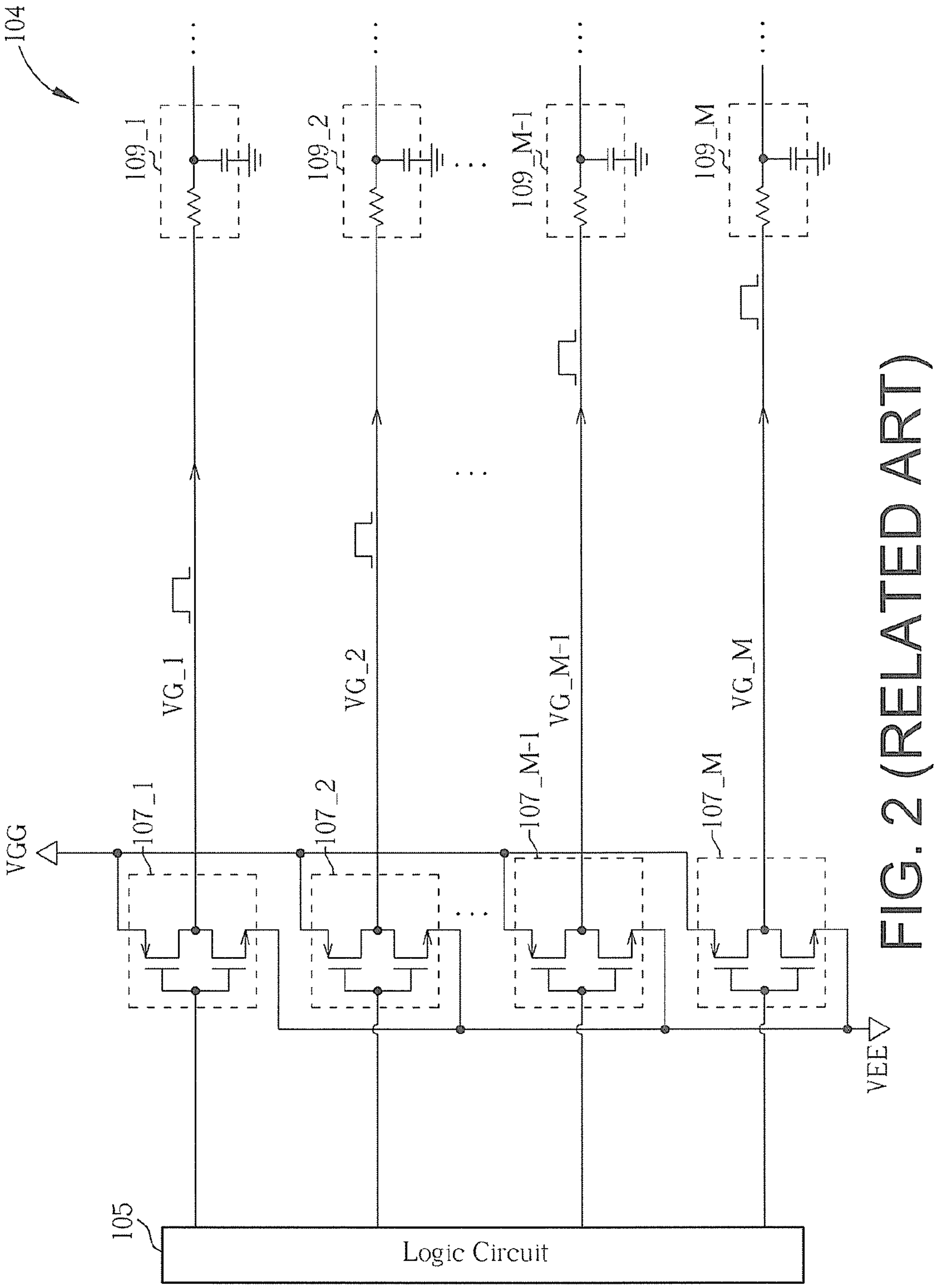
FIG. 2 (RELATED ART)
FIG. 2 is a schematic diagram of a gate driver of the TFT LCD monitor shown in FIG. 1.
Figure 3:
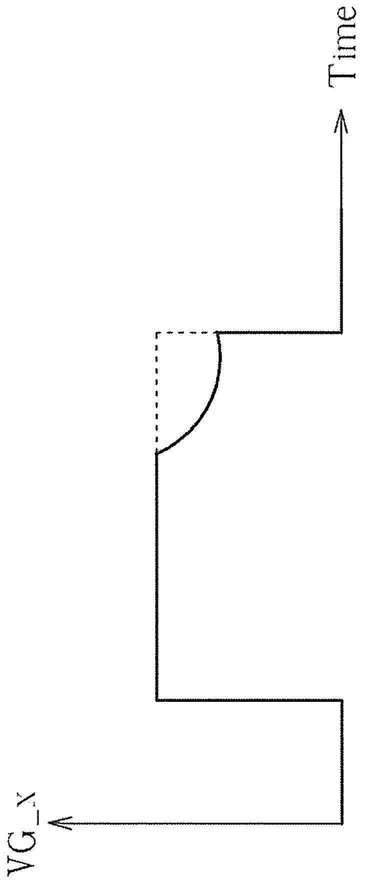
FIG. 3 is a timing diagram of a gate driving signal.
Figure 4:
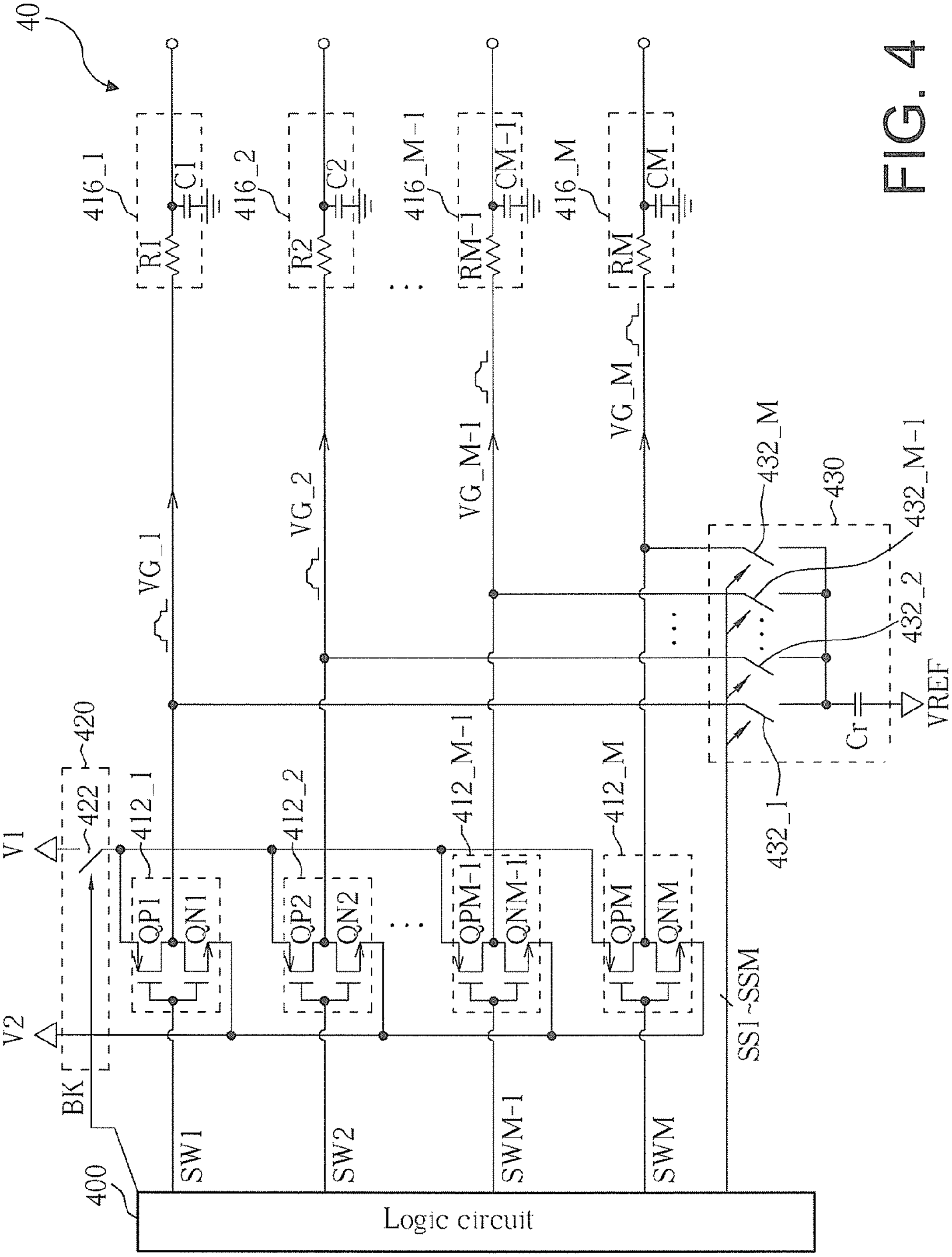
FIG. 4 is a schematic diagram of a gate driver according to an embodiment of the present invention.

Please refer to FIG. 4, which is a schematic diagram of a gate driver 40 according to an embodiment of the present invention. The gate driver 40 is utilized for controlling pixel updating timing of a liquid crystal display (LCD) apparatus, i.e. controlling gate voltages of thin film transistors (TFT) 112 shown in FIG. 1. The gate driver 40 includes a logic circuit 400, buffers 412_1-412_M, a switch module 420 and a charge recycle module 430. The logic circuit 440 is utilized for generating switch signals SW1-SWM, a breaking signal BK and sharing signals SS1-SSM. The buffers 412_1-412_M are utilized for determining to provide a first voltage V1 or a second voltage V2 respectively according to the switch signals SW1-SWM to generate gate driving signal VG_1-VG_M, which are respectively utilized for scanning a row of TFTs. The switch module 420 is utilized for stopping outputting the first voltage V1 to load modules 416_1-416_M according to the breaking signal BK. Note that, the load modules 416_1-416_M are equivalent circuits of loads. Finally, the charge recycle module 430 is utilized for sharing charges with the load modules 416_1-416_M according to the sharing signals SS1-SSM to adjust the waveforms of the gate driving signals VG_1-VG_M. Since the gate driving signals VG_1-VG_M indicate activation timing of the TFTs 112 in form of square wave, the switch module 420 is particularly open during forward and backward edges of the square waves, and meanwhile, the charge recycle module 430 is connected to a load module 416_*x* which is just receiving a square wave. As a result, the charge recycle module 430 and the load module 416_*x* independently share stored charges to adjust waveforms of the forward and backward edges of the square waves of the gate driving signals VG_1-VG_M.

In short, to adjust the waveforms of the gate driving signals VG_1-VG_M, the gate driver 40 additionally includes the charge recycle module 430 to adjust charges stored in the load modules 416_1-416_M. During the forward and backward edges of the square waves of the gate driving signals VG_1-VG_M, the charge recycle module 430 and the load modules 416_1-416_M share the stored charges to generate the square waves of the gate driving signals VG_1-VG_M with less electric energy through recycling and re-utilizing the charges. Since charge sharing is a gradual process, the forward and backward edges of the square waves of the gate driving signals VG_1-VG_M vary smoothly, and therefore the coupling effect can be mitigated. Compared to the generation process of the square waves of the prior art, the charge recycle module 430 recycles charges from the load modules when the gate driving signals VG_1-VG_M are at the first voltage V1, and re-utilizes the recycled charges to generate a next square wave to reduce power consumption of the gate driver 40 instead of alternatively charging and discharging the load modules 109_1~109_M through external voltage sources, which leads to power dissipation. Through charge redistribution, the recycled charges enhance the gate driving signal VG_1-VG_M to a first default voltage in advance, such that the external voltage source can increase the gate driving signal VG_1-VG_M to the first voltage V1 with less electric energy.

In detail, the charge recycle module 430 includes an adjustment capacitor Cr and switches 432_1-432_M. The switches 432_1-432_M are utilized for determining whether the adjustment capacitor Cr shares stored charges with the load modules 416_1-416_M according to the sharing signals SS1-SSM. One end of the adjustment capacitor Cr is coupled to a reference voltage source, and therefore a circuit designer can control an amount of the recycled and re-utilized charges through selecting a preferable reference voltage VREF provided by the reference voltage source, so as to determine the first default voltage and an adjustment margin. The buffers 412_1-412_M includes p-type field-effect transistors (FETs) QP1-QPM and n-type FETs QN1-QNM, and are utilized for determining whether to provide the first voltage V1 or the second voltage V2 to the load modules 416_1-416_M according to the switch signals SW_1-SW_M. The load modules 416_1-416_M respectively include load resistor R1-RM and load capacitors C1-CM, and are utilized for storing or outputting charges in response to switch operations of the buffers 412_1-412_M to generate the gate driving signals VG_1-VG_M. In addition, in order to implement the charge sharing operations, the switch module 420 preferably includes a switch 422 to break a power supply path of the first voltage V1 according to the breaking signal BK during the forward and backward edges of the square waves of the gate driving signals VG_1-VG_M. As a result, the load capacitors C1-CM and the adjustment capacitor Cr can independently share stored charges.

Figure 5:
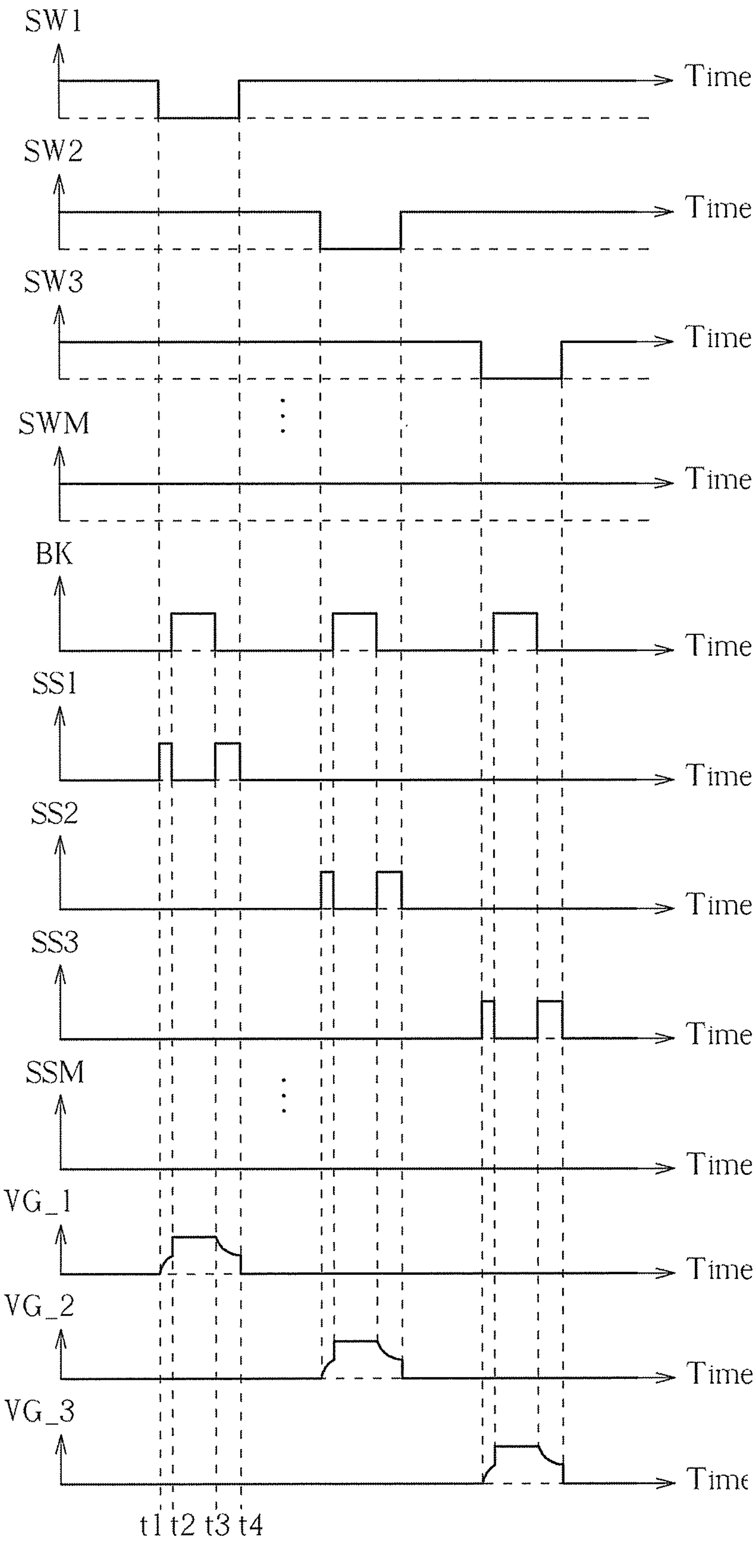
FIG. 5 is a timing diagram of switch signals, a breaking signal, sharing signals and gate driving signals of the gate driver shown in FIG. 4.

For example, please refer to FIG. 5, which is a timing diagram of the switch signals SW_1-SW_M, the breaking signal BK, the sharing signals SS1-SSM and the gate driving signals VG_1-VG_3, and illustrates a generation process of the gate driving signal VG_1. The breaking signal BK indicates the switch 422 to break the power supply path of the first voltage V1 during the forward edge (between times t1, t2) of the square wave of the gate driving signal VG_1. The switch signals SW_1-SW_M indicate the buffers 412_1-412_M to break electric connections among the load modules 416_1-416_M. The sharing signal SS1 indicates the switch 432_1 to connect the adjustment capacitor Cr and the load capacitor C1, such that the charges stored in the adjustment capacitor Cr are transferred to the load capacitor C1 to enhance the gate driving signal VG_1 to the first default voltage in advance. During a middle interval (between times t2, t3) of the square wave of the gate driving signal VG_1, the breaking signal BK indicates the switch 422 to re-transmit the first voltage V1 to the load module 416_1. The switch signal SW_1 indicates the buffers 412_1-412_M to transmit the first voltage V1. The sharing signal SS1 indicates the switch 432_1 to isolate the adjustment capacitor Cr from the load capacitor C1 to enable the gate driving signal VG_1. Finally, during the backward edge (between times t3, t4) of the square wave of the gate driving signal VG_1, the breaking signal BK re-indicates the switch 422 to break the power supply path of the first voltage V1. The switch signals SW_1-SW_M indicate the buffers 412_1-412_M to break the electric connections among the load modules 416_1-416_M. The sharing signal SS1 indicates the switch 432_1 to connect the adjustment capacitor Cr and the load capacitor C1, such that charges stored in the load capacitor C1 are recycled to the adjustment capacitor Cr as reserve charges, which charge the load capacitor C1 in advance to generate the square wave of the gate driving signal VG_2. Generation processes of the gate driving signals VG_2-VG_M is similar to the generation process of the gate driving signals VG_1, and are not further narrated herein. Therefore, through sharing charges during the forward and backward edges of the square waves of the gate driving signals VG_1-VG_M, the gate driver 40 can recycle and re-utilize load charges to economically adjust the waveforms of the gate driving signals VG_1-VG_M.

Figure 6:
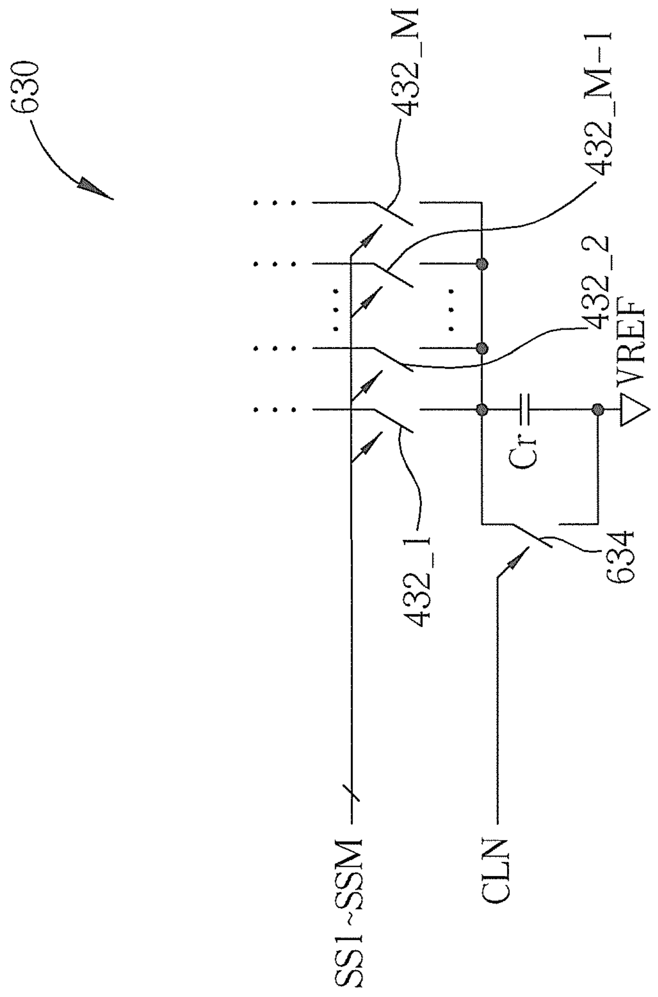
FIG. 6 is a schematic diagram of an alternative embodiment of a charge recycle module of the gate driver shown in FIG. 4.

Note that, the adjustment capacitor Cr still stores some charges after the adjustment capacitor Cr and the load capacitors C1-CM share stored charges during the forward edges of the square waves of the gate driving signals VG_1-VG_M, which leads to a decline in efficiency of a next recycling operation of the adjustment capacitor Cr, and therefore an adjustment margin of the next recycling operation shrinks. To guarantee that the adjustment margins for the gate driving signals VG_1-VG_M are consistent, please refer to FIG. 6, which is a schematic diagram of a charge recycle module 630, which is an alternative embodiment of the charge recycle module 430. The charge recycle module 630 additionally includes a switch 634 coupled to two ends of the adjustment capacitor Cr and utilized for connecting the two ends of the adjustment capacitor Cr during the middle intervals of the square waves of the gate driving signals VG_1-VG_M according to a clean signal CLN provided by the logic circuit 400 to clean the charges stored in the adjustment capacitor Cr and guarantee that the adjustment margins for the gate driving signals VG_1-VG_M are consistent.

Figure 7:
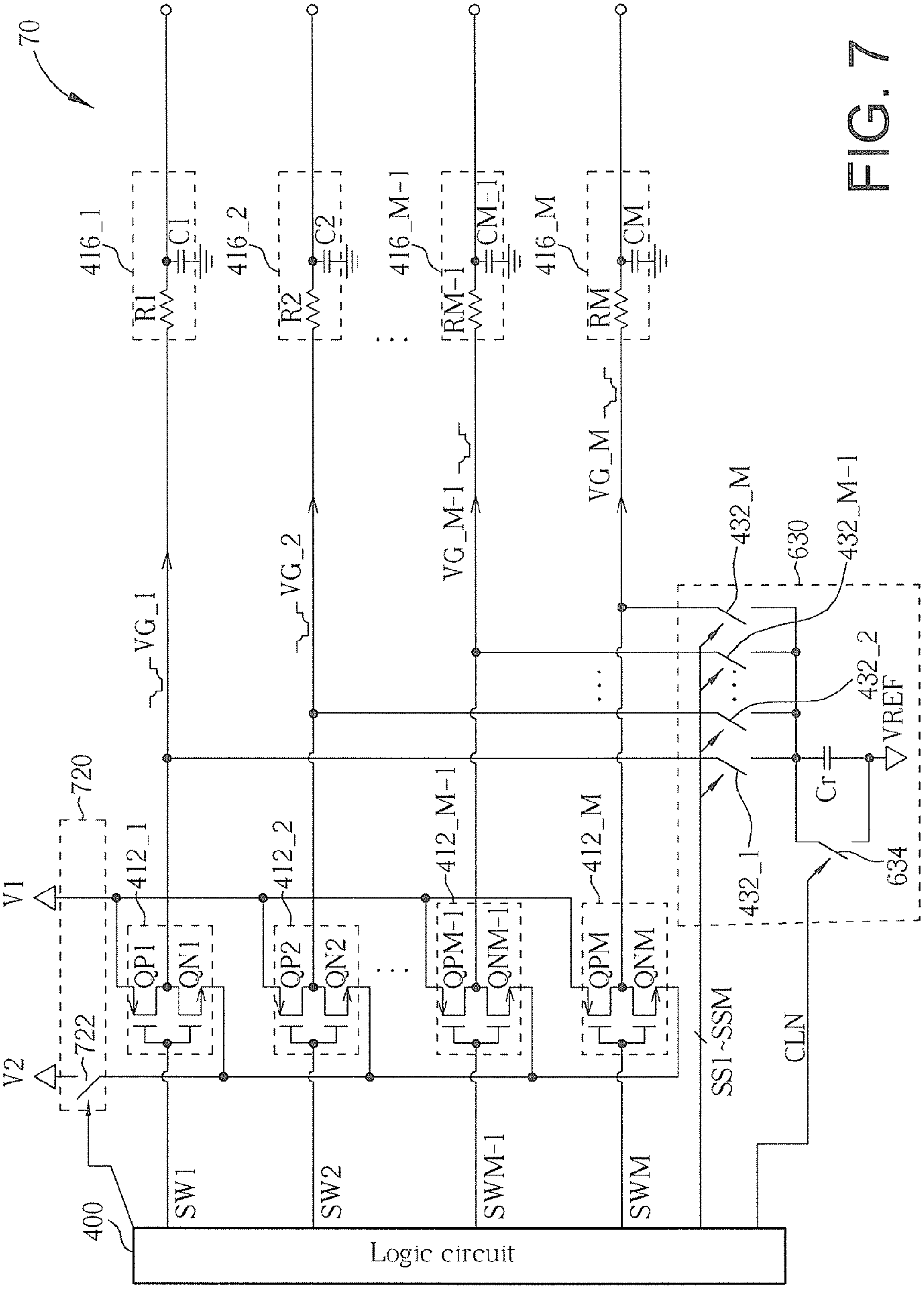
FIG. 7 is a schematic diagram of a gate driver according to an embodiment of the present invention.
Figure 8:
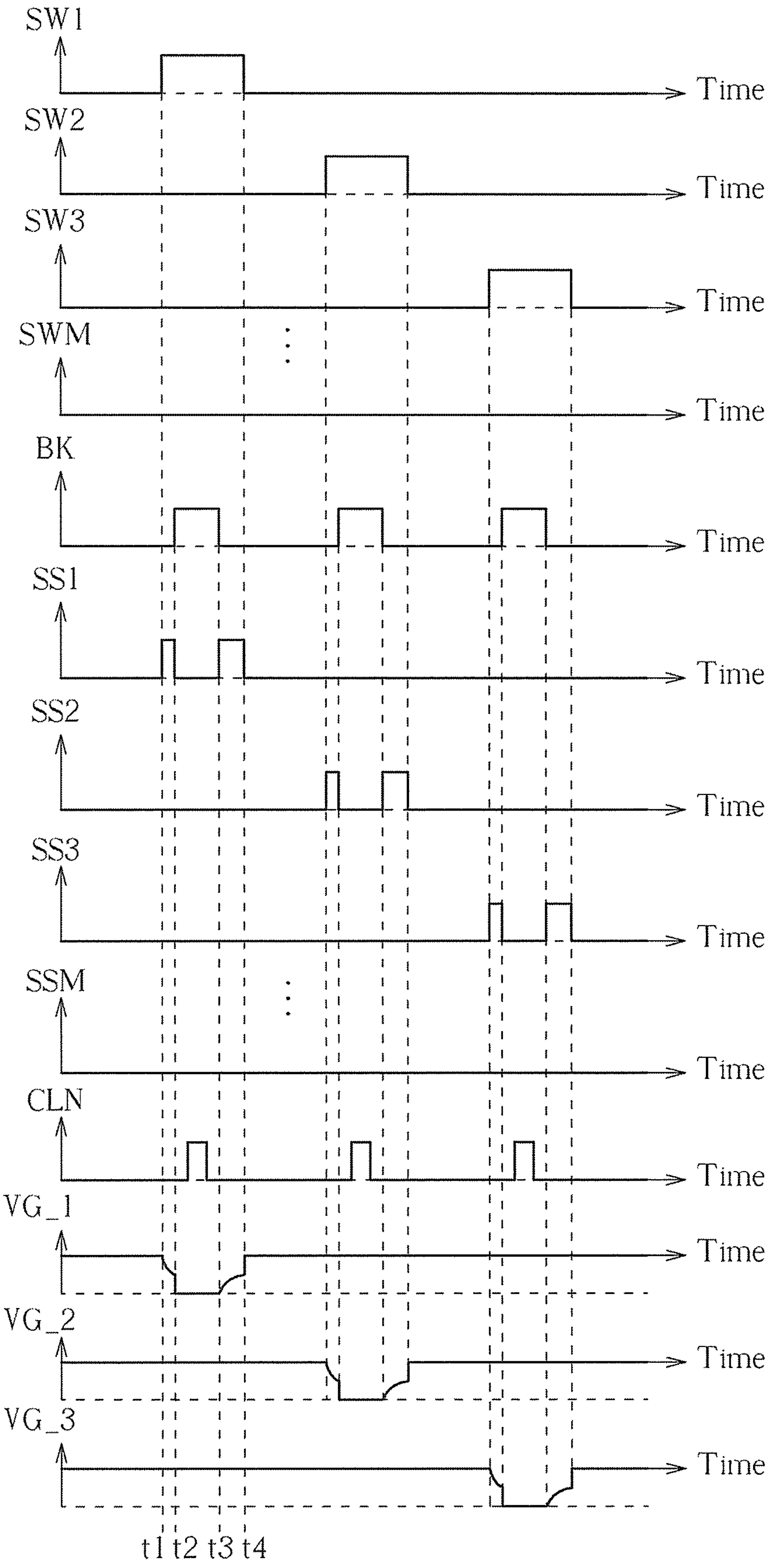
FIG. 8 is a timing diagram of switch signals, a breaking signal, sharing signals, a clean signal and gate driving signals of the gate driver shown in FIG. 7.

Note that, the gate driver 40 is designed for an LCD apparatus employing N-type TFTs in pixel cells. That is, the N-type TFTs are enabled when the gate driving signals VG_1-VG_M are at the first voltage V1 to update pixel contents. Alternatively, an LCD may employ P-type TFTs in pixel cells. In such a situation, please refer to FIG. 7, which is a schematic diagram of a gate driver 70 which is an alternative embodiment of the gate driver 40. The gate driver 70 is utilized for scanning the P-type TFTs of the LCD apparatus. In the gate driver 70, a switch module 720 replaces the switch module 420 of the gate driver 40, and includes a switch 722 which breaks a power supply path of the second voltage V2 according to the breaking signal BK. Please refer to FIG. 8, which is a schematic diagram of the switch signals SW_1-SW_M, the breaking signal BK, the sharing signals SS1-SSM, the clean signal CLN and the gate driving signals VG_1-VG_3 of the gate driver 70. FIG. 8 is similar to FIG. 5, and merely differs in polarities of the gate driving signals VG_1-VG_M. Related description can be referred in the above, and is not narrated herein.

Figure 9:
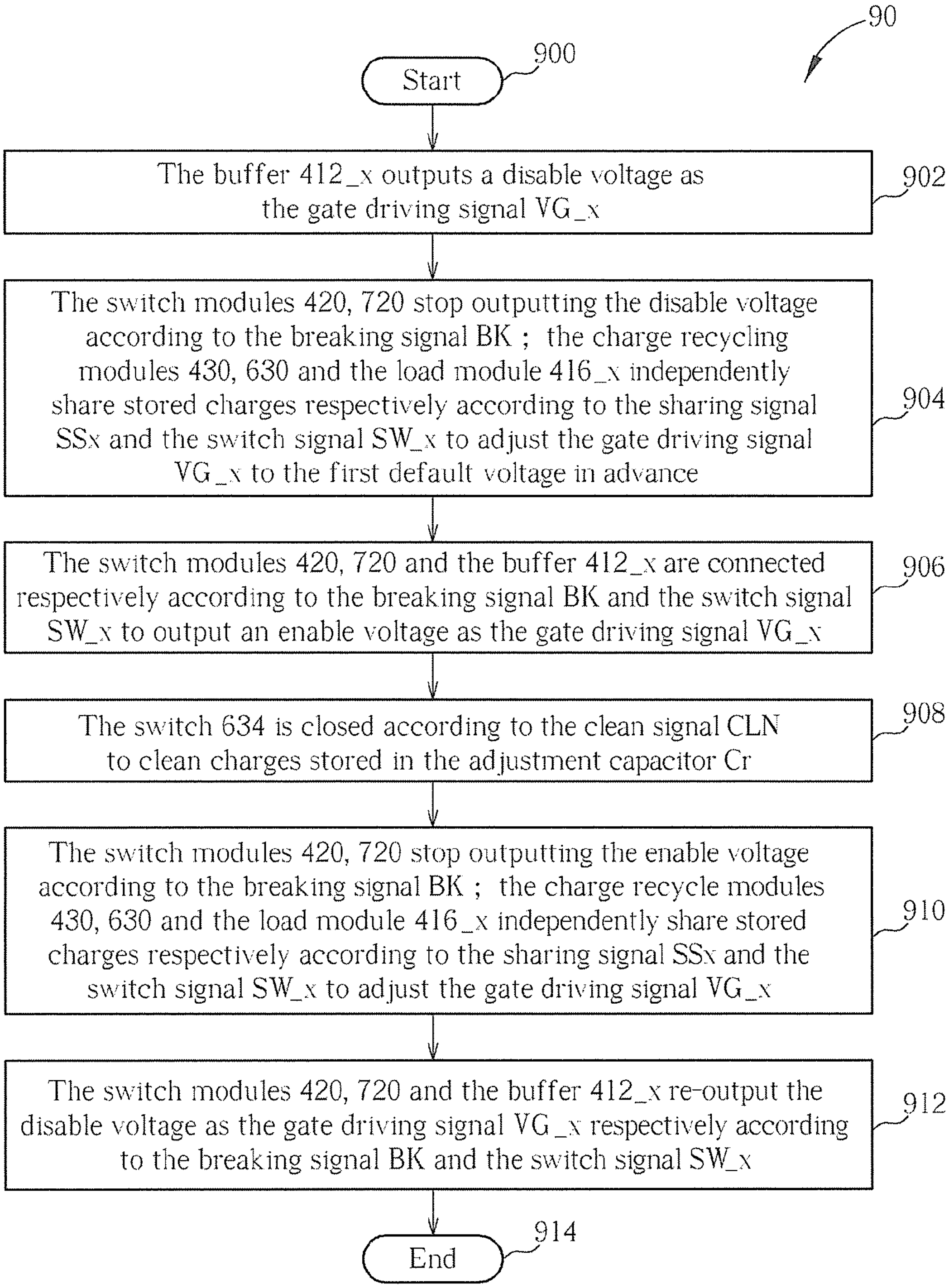
FIG. 9 is a schematic diagram of a gate driving process according to an embodiment of the present invention.

The generation processes of the gate drivers 40, 70 for the gate driving signals VG_1-VG_M can be summarized into a gate driving process 90, as illustrated in FIG. 9.

The gate driving process 90 includes the following steps:

Step 900: Start.

Step 902: The buffer 412_*x* outputs a disable voltage as the gate driving signal VG_x.

Step 904: The switch modules 420, 720 stop outputting the disable voltage according to the breaking signal BK; the charge recycling modules 430, 630 and the load module 416_*x* independently share stored charges respectively according to the sharing signal SSx and the switch signal SW_x to adjust the gate driving signal VG_x to the first default voltage in advance.

Step 906: The switch modules 420, 720 and the buffer 412_*x* are connected respectively according to the breaking signal BK and the switch signal SW_x to output an enable voltage as the gate driving signal VG_x.

Step 908: The switch 634 is closed according to the clean signal CLN to clean charges stored in the adjustment capacitor Cr.

Step 910: The switch modules 420, 720 stop outputting the enable voltage according to the breaking signal BK; the charge recycle modules 430, 630 and the load module 416_*x* independently share stored charges respectively according to the sharing signal SSx and the switch signal SW_x to adjust the gate driving signal VG_x.

Step 912: The switch modules 420, 720 and the buffer 412_*x* re-output the disable voltage as the gate driving signal VG_x respectively according to the breaking signal BK and the switch signal SW_x.

Step 914: End.

In the gate driving process 90, if the TFTs are N-type FETs, the disable voltage is a low voltage, and the enable voltage is a high voltage. Inversely, if the TFTs are P-type FETs, the disable voltage is the high voltage, and the enable voltage is the low voltage.

In the prior art, variations of the gate driving signals VG_1-VG_M are coupled into the equivalent capacitors 114 via parasitic capacitors, such that the equivalent capacitors 114 store image contents with biases. In comparison, according to the present invention, the power supply path is cut off through switch operations during the forward and backward edges of the gate driving signals VG_1-VG_M, and therefore the load modules 416_1-416_M and the charge recycle modules 430, 630 can independently share stored charges. Since charge sharing is a gradual process, the gate driving signals VG_1-VG_M decrease smoothly, and therefore the coupling effect is mitigated. In addition, through recycling charges from the load modules 416_1-416_M, the charge recycle modules 430, 630 enhance the gate driving signals VG_1-VG_M to the first default (quasi-enable) voltage in advance to reduce power consumption of the gate drivers 40, 70.

Figure 10:
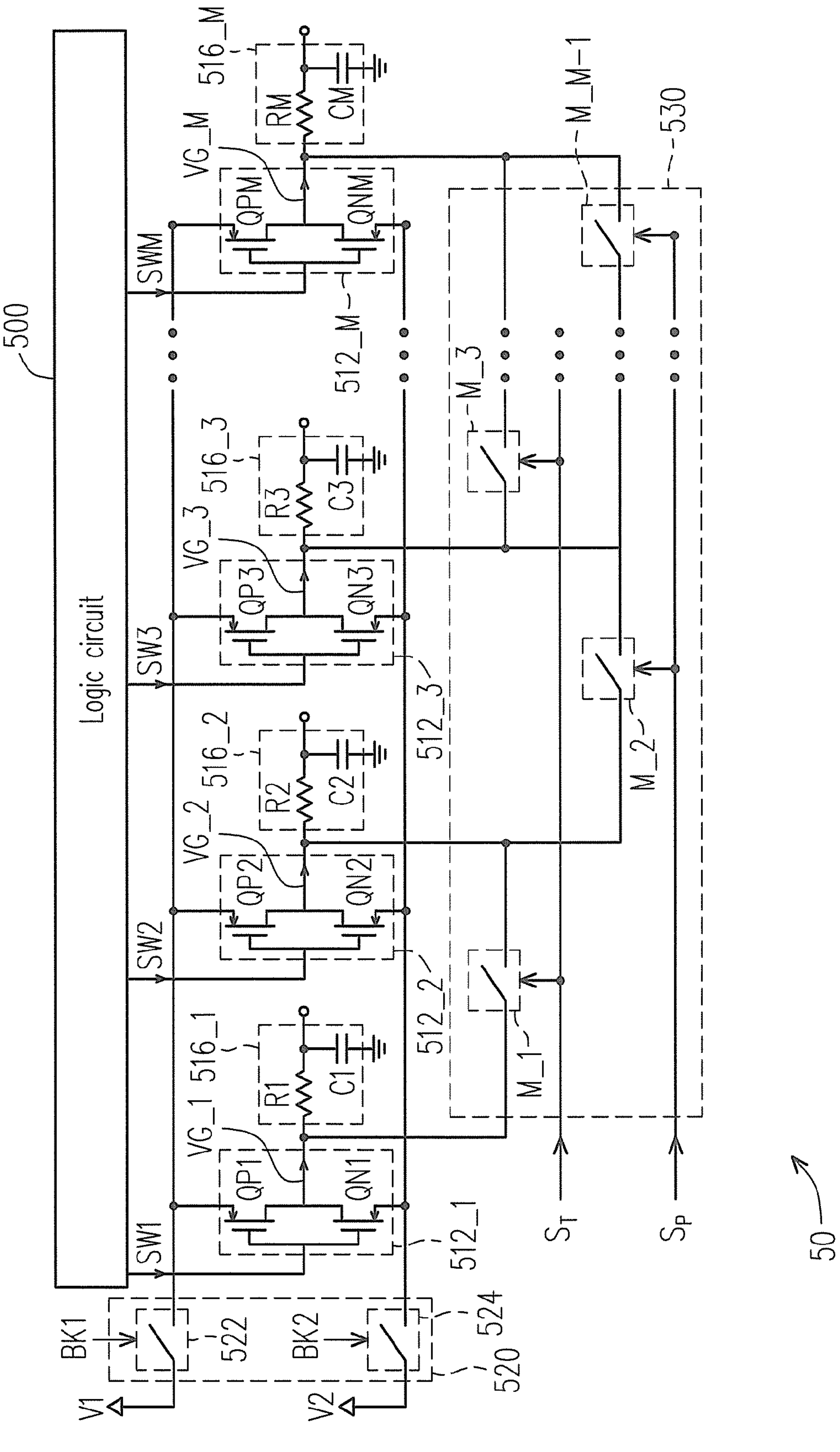
FIG. 10 is a schematic diagram of a gate driver 50 according to an embodiment of the invention.
Figure 11:
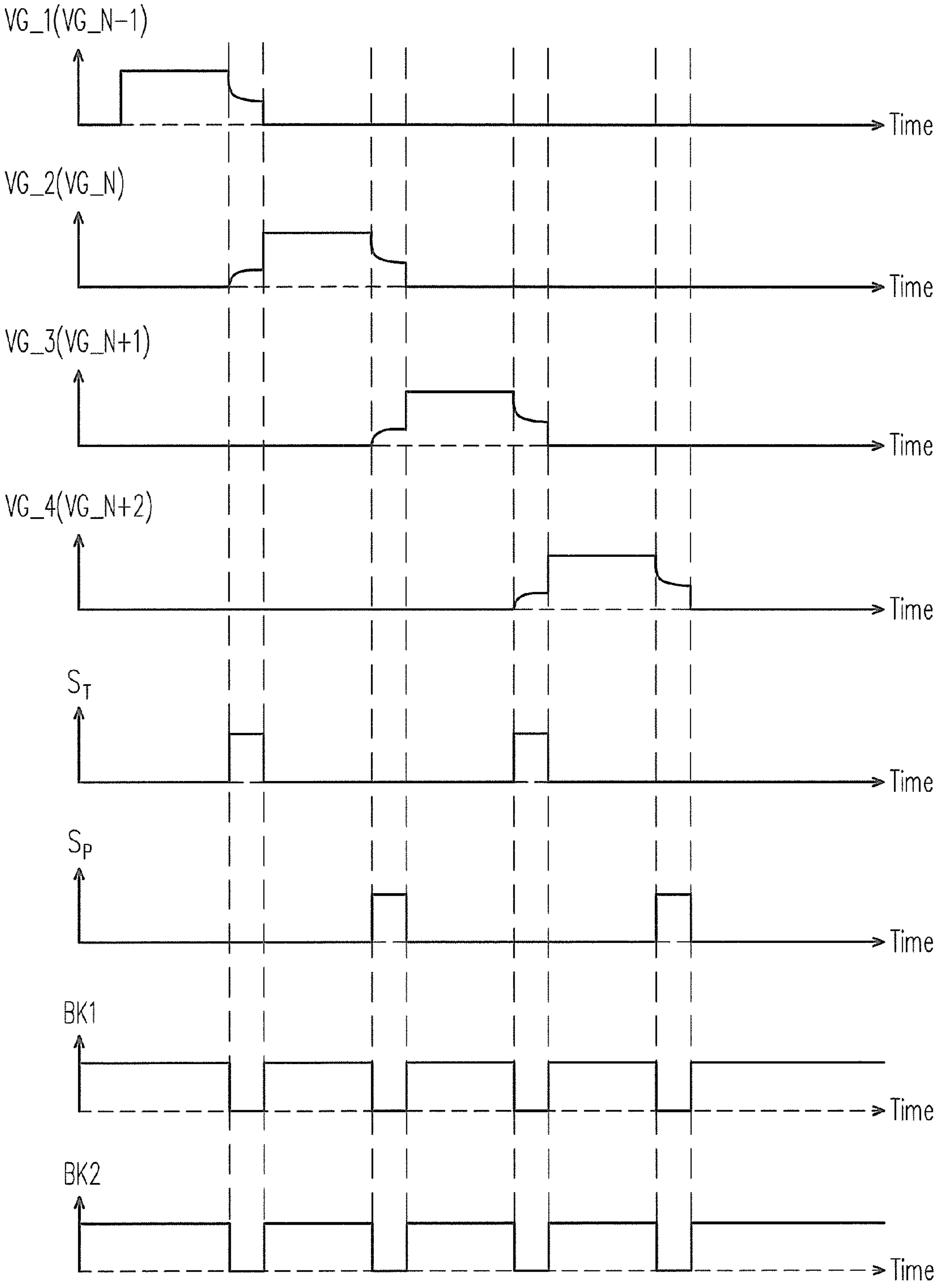
FIG. 11 is a timing diagram of breaking signals BK1 and BK2, sharing signals $S_T$ and $S_P$, and gate driving signals VG_1~VG_4 of the gate driver shown in FIG. 10.

FIG. 10 is a schematic diagram of a gate driver 50 according to an embodiment of the invention. FIG. 11 is a timing diagram of breaking signals BK1 and BK2, sharing signals $S_T$ and $S_P$, and gate driving signals VG_1-VG_4 of the gate driver 50 shown in FIG. 10. Please refer to FIG. 10 and FIG. 11, the gate driver 50 is utilized for controlling pixel updating timing of a liquid crystal display (LCD) apparatus, i.e. controlling gate voltages of thin film transistors (TFT) 112 shown in FIG. 1. In the present embodiment, the gate driver 50 includes a logic circuit 500, buffers 512_1-512_M, a switch module 520, and a charge sharing module 530.

Note that, since the gate driving signals VG_1-VG_M indicate activation timing of the TFTs 112 in form of square wave in the present embodiment, the switch module 520 is particularly open during forward and backward edges of the square waves. Meanwhile, the charge sharing module 530 is sequentially connected to the load modules 516_1-516_M to allow the output ends of the buffers to share charges, so as to adjust waveforms of the forward and backward edges of the square waves of the gate driving signals VG_1-VG_M.

Specifically, the logic circuit 500 is utilized for generating switch signals SW1-SWM. The buffers 512_1-512_M are utilized for determining to provide a first voltage V1 or a second voltage V2 respectively according to the switch signals SW1-SWM to generate gate driving signals VG_1-VG_M, which are respectively utilized for scanning a row of TFTs.

The switch module 520 is utilized for stopping outputting the first voltage V1 or the second voltage V2 to the load modules 516_1-516_M according to the first breaking signal BK1 and the second breaking signal BK2. The load modules 516_1-516_M are equivalent circuits of loads. In the present embodiment, the switch module 520 includes switches 522 and 524. The switch 522 is coupled between each of the buffers and the first voltage source V1, which electrically isolates the first voltage source V1 from each of the buffers according to the first breaking signal BK1 during the forward edge and the backward edge of the square wave of each of the gate driving signals. On the other hand, the switch 524 is coupled between each of the buffers and the second voltage source V2, which electrically isolates the second voltage source V2 from each of the buffers according to the second breaking signal BK2 during the forward edge and the backward edge of the square wave of each of the gate driving signals.

The charge sharing module 530 allows the output ends of the buffers to share charges according to the first sharing signal $S_T$ and the second sharing signal $S_P$ to adjust waveforms of the gate driving signals VG_1~VG_M. In the present embodiment, the charge sharing module 530 includes switches M_1~M_M-1. Herein, based on the control signals, the switches M_1~M_M-1 can be categorized into two groups. One is the group comprising the odd$^{th}$ switches M_1, M_3, . . . , and M_M-2 (not shown), i.e. the plurality of third switches, which are controlled by the first sharing signal $S_T$, and the other one is the group comprising the even$^{th}$ switches M_2, M_4 (not shown), . . . , and M_M-1, i.e. the plurality of fourth switches, which are controlled by the second sharing signal $S_P$. The first sharing signal $S_T$ and the second sharing signal $S_P$ alternately turn on the third switches M_1, M_3, . . . , and M_M-2 and the fourth switches M_2, M_4, . . . , and M_M-1, so as to adjust waveforms on the previous charging path and the next charging path of pixels of the LCD monitor 10.

For example, during the backward edge of the gate driving signal VG_1 and the frontward edge of the gate driving signal VG_2, the switches 522 and 524 are respectively open according to the breaking signals BK1 and BK2. Meanwhile, the switch M_1 is turned on by the first sharing signal $S_T$ to electrically connect the output ends of the buffers 512_1 and 512_2 to allow the two buffers to share charges, so as to adjust waveforms of the forward and backward edges of the gate driving signals VG_1 and VG_2. Next, during the backward edge of the gate driving signal VG_2 and the frontward edge of the gate driving signal VG_3, the switches 522 and 524 are respectively open according to the breaking signals BK1 and BK2. Meanwhile, the switch M_2 is turned on by the second sharing signal $S_P$ to electrically connect the output ends of the buffers 512_2 and 512_3 to allow the two buffer to share charges, so as to adjust waveforms of the forward and backward edges of the gate driving signals VG_2 and VG_3. The charge sharing manner of the other buffers can be deduced based on the foregoing description, which is not to be reiterated herein.

Note that, in the present embodiment, when the switch M_1 electrically connects the buffers 512_1 and 512_2 according to the first sharing signal $S_T$, the switch M_2 isolates the buffer 512_2 from the buffer 512_3 according to the second sharing signal $S_P$. On the contrary, when the switch M_2 electrically connects the buffers 512_2 and 512_3 according to the second sharing signal $S_P$, the switches M_1 and M_3 isolate the buffers 512_1 and 512_2 from the buffers 512_3 and 512_4 according to the first sharing signal $S_T$.

In other words, as time goes on, the waveform adjustment of the gate driving signal VG_N−1 is implemented along with that of the gate driving signal VG_N. Meanwhile, the first sharing signal $S_T$ turns on the third switch M_N−1 (not shown) to allow the buffers 512_N−1 and 512_N (not shown) to share charges. The waveform adjustment of the gate driving signal VG_N is implemented along with that of the gate driving signal VG_N+1. Meanwhile, the second sharing signal $S_P$ turns on the fourth switch M_N (not shown). The waveform adjustment of the gate driving signal VG_N+1 is implemented along with that of the gate driving signal VG_N+2. Meanwhile, the first sharing signal $S_T$ turns on the third switch M_N+1 (not shown), and so on.

In the present embodiment, by using the first sharing signal $S_T$ to control the third switches M_1, M_3, . . . , and M_M-2, and by using the second sharing signal $S_P$ to control the fourth switches M_2, M_4, . . . , and M_M-1, the output ends of each buffers can release a part of charges through the switches, so that the output voltage can achieve the expected level. As a result, abnormal image contents would not be generated on the LCD monitor 10, and the charges released from the output ends of the buffers would be provided to the next output end, so that the charges required to turn on the next output end are decreased to reduce power consumption.

Herein, the output ends of the two buffers are controlled as a whole by sequentially transmitting two sharing signals $S_T$ and $S_P$ in the present embodiment. In other embodiments, the output ends of more than three buffers can be controlled as a whole by sequentially transmitting more than three sharing signals, and the same or similar descriptions thereof are therefore not repeated here. Furthermore, the breaking signals BK1 and BK2 and the sharing signals $S_T$ and $S_P$ can be selectively generated by the logic circuit 500 or other control circuits except for the gate driver 50. In another embodiment, the switches 522 and 524 can be simply controlled by a single breaking signal.

Figure 12:
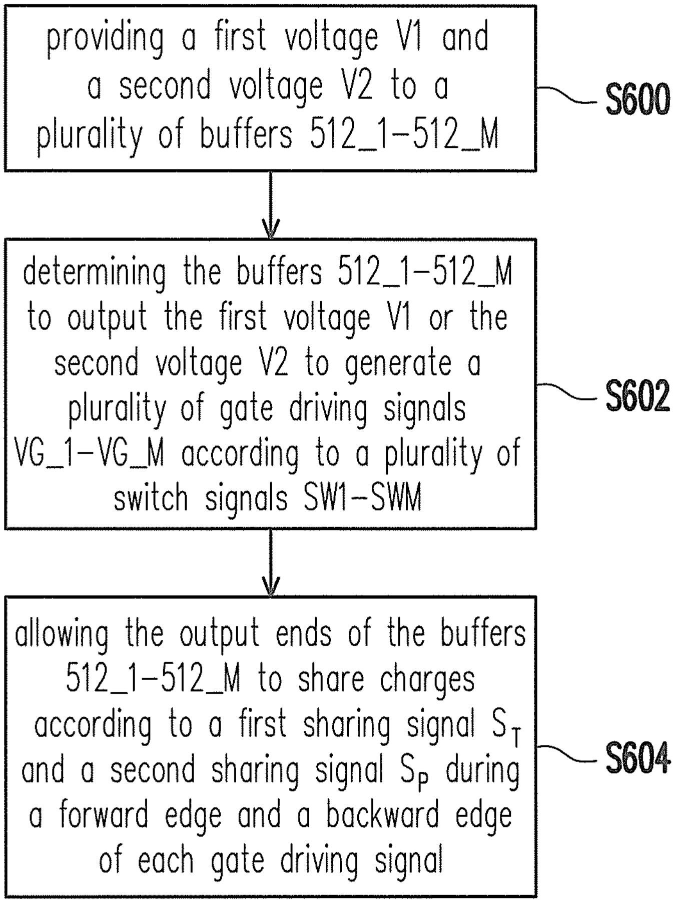
FIG. 12 is a flow chart illustrating a gate driving method according to another embodiment of the invention.

FIG. 12 is a flow chart illustrating a gate driving method according to another embodiment of the invention. Referring to FIG. 10 to FIG. 12, the gate driving method of the present embodiment is adapted to control a display apparatus. The gate driving method includes the following steps. First of all, in step S600, a first voltage V1 and a second voltage V2 are provided to a plurality of buffers 512_1-512_M. Next, in step S602, the buffers 512_1-512_M are determined to output the first voltage V1 or the second voltage V2 to generate a plurality of gate driving signals VG_1-VG_M according to a plurality of switch signals SW1-SWM. Thereafter, in step S604, the output ends of the buffers are allowed to share charges according to the first sharing signal $S_T$ and the second sharing signals $S_P$ during the forward edge and the backward edge of the square wave of each of the gate driving signals.

Besides, the gate driving method described in this embodiment of the invention is sufficiently taught, suggested, and embodied in the embodiments illustrated in FIG. 10 to FIG. 11, and therefore no further description is provided herein.

In summary, in the exemplary embodiments of the invention, the display controls and adjusts the outputs of the gate driver by the foregoing gate driving method, so as to reduce the extra cost of the system circuit. Furthermore, the display also sequentially controls the outputs of each gate driver to highly reduce the power consumption of the system. As a result, abnormal image contents would not be generated on the LCD monitor 10, and the charges released from the output ends of the buffers would be provided to the next output end, so that the charges required to turn on the next output end are decreased to reduce power consumption.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A gate driver for controlling a display apparatus, the gate driver comprising:

a logic circuit generating a plurality of switch signals;

a plurality of buffers coupled to the logic circuit, each of the buffers comprising a first end coupled to the logic circuit, a second end coupled to a first voltage source, a third end coupled to a second voltage source, and an output end coupled to a load module, wherein each of the buffers determines to provide a first voltage or a second voltage according to one of the switch signals to generate a gate driving signal; and a charge sharing module coupled to the output ends of the buffers and allowing the output ends of the buffers to share charges according to a plurality of sharing signals during a forward edge and a backward edge of a square wave of each of the gate driving signals, wherein the charge sharing module comprises:

a plurality of third switches coupled between the output ends of the corresponding buffers, the third switches sequentially electrically connecting corresponding buffers of the buffers according to a first sharing signal during the forward edges and the backward edges of the square waves of the gate driving signals; and a plurality of fourth switches coupled between the output ends of the corresponding buffers, the fourth switches sequentially electrically connecting corresponding buffers of the buffers according to a second sharing signal during the forward edges and the backward edges of the square waves of the gate driving signals, wherein when the third switches electrically connect the buffers corresponding to the third switches according to the first sharing signal, the fourth switches electrically isolate the buffers corresponding to the fourth switches from one another according to the second sharing signal, and when the fourth switches electrically connect the buffers corresponding to the fourth switches according to the second sharing signal, the third switches electrically isolate the buffers corresponding to the third switches from one another according to the first sharing signal.

2. The gate driver as claimed in claim 1, further comprising:

a switch module coupled between the buffers, the first voltage source, and the second voltage source, wherein the switch module electrically isolates the first voltage source and the second voltage source from the buffers according to at least one breaking signal during the forward edge and the backward edge of the square wave of each of the gate driving signals.

3. The gate driver as claimed in claim 2, wherein the switch module is open during the forward edge and the backward edge of the square wave of each of the gate driving signals according to the at least one breaking signal, and the sharing signal corresponding to the gate driving signal indicates the charge sharing module to connect to the loads corresponding to the buffers, so as to allow the output ends of the buffers to share charges.

4. The gate driver as claimed in claim 2, wherein the switch module comprises:

a first switch coupled between the buffers and the first voltage source, and the first switch electrically isolating the first voltage source from the buffers according to a first breaking signal during the forward edge and the backward edge of the square wave of each of the gate driving signals.

5. The gate driver as claimed in claim 2, wherein the switch module comprises:

a second switch coupled between the buffers and the second voltage source, and the second switch electrically isolating the second voltage source from the buffers according to a second breaking signal during the forward edge and the backward edge of the square wave of each of the gate driving signals.

6. The gate driver as claimed in claim 1, wherein each of the buffers comprises:

a P-type field-effect transistor (FET) comprising a gate end coupled to the first end, a source end coupled to the second end, and a drain end coupled to the output end, the P-type FET determining electrical connection between the output end and the first voltage source according to the switch signal; and an N-type field-effect transistor (FET) comprising a gate end coupled to the first end, a source end coupled to the third end, and a drain end coupled to the output end, the N-type FET determining electrical connection between the output end and the second voltage source according to the switch signal.

7. The gate driver as claimed in claim 1, wherein the third switches and the fourth switches alternately electrically connect the buffers corresponding to the third switches and the buffers corresponding to the fourth switches according to the first sharing signal and the second sharing signal, respectively.

8. The gate driver as claimed in claim 1, wherein the gate driver further generates at least one breaking signal and the sharing signals.

9. A gate driving method for controlling a display apparatus, the gate driving method comprising:

providing a first voltage and a second voltage to a plurality of buffers;

determining the buffers to output the first voltage or the second voltage to generate a plurality of gate driving signals according to a plurality of switch signals; and allowing output ends of the buffers to share charges according to a plurality of sharing signals during a forward edge and a backward edge of a square wave of each of the gate driving signals, wherein the step of allowing the output ends of the buffers to share the charges comprises:

sequentially electrically connecting a plurality of corresponding buffers of the buffers according to a first sharing signal during the forward edges and the backward edges of the square waves of the gate driving signals; and sequentially electrically connecting a plurality of corresponding buffers of the buffers according to a second sharing signal during the forward edges and the backward edges of the square waves of the gate driving signals, wherein when the buffers corresponding to the first sharing signal are electrically connected according to the first sharing signal, electrically isolating the buffers corresponding to the second sharing signal from one another according to the second sharing signal, and when the buffers corresponding to the second sharing signal are electrically connected according to the second sharing signal, electrically isolating the buffers corresponding to the first sharing signal from one another according to the first sharing signal.

10. The gate driving method as claimed in claim 9, further comprising:

electrically isolating the first voltage and the second voltage from the buffers according to at least one breaking signal during the forward edge and the backward edge of the square wave of each of the gate driving signals.

11. The gate driving method as claimed in claim 10, wherein the step of electrically isolating the first voltage and the second voltage from the buffers comprises:

electrically isolating the first voltage from the buffers according to a first breaking signal during the forward edge and the backward edge of the square wave of each of the gate driving signals.

12. The gate driving method as claimed in claim 10, wherein the step of electrically isolating the first voltage and the second voltage from the buffers comprises:

electrically isolating the second voltage from the buffers according to a second breaking signal during the forward edge and the backward edge of the square wave of each of the gate driving signals.

13. The gate driving method as claimed in claim 9, wherein the step of allowing the output ends of the buffers to share charges further comprises:

alternately electrically connecting the buffers corresponding to the first sharing signal and the buffers corresponding to the second sharing signal according to the first sharing signal and the second sharing signal, respectively.

14. The gate driving method as claimed in claim 9, further comprising:

generating at least one breaking signal and the sharing signals.

* * * * *